US005827889A

United States Patent [19]

Cunico

[11] Patent Number: 5,827,889

[45] Date of Patent: Oct. 27, 1998

[54] ANAL FISSURE TREATMENT PREPARATION AND METHOD

[76] Inventor: Robert Cunico, 4124 Lakeside Dr., Richmond, Calif. 94806

[21] Appl. No.: 883,811

[22] Filed: Jun. 27, 1997

Related U.S. Application Data

[63] Continuation of Ser. No. 636,655, Apr. 23, 1996, abandoned.

[51] Int. Cl.[6] .................... A61K 31/195

[52] U.S. Cl. .................... 514/565

[58] Field of Search .................... 514/565

[56] References Cited

U.S. PATENT DOCUMENTS

| | | | |
|---|---|---|---|
| 4,804,674 | 2/1989 | Curtis-Prior et al. | 514/400 |
| 5,217,997 | 6/1993 | Levere et al. | 514/565 |
| 5,364,884 | 11/1994 | Varma et al. | 514/551 |
| 5,385,940 | 1/1995 | Moskowitz | 514/565 |
| 5,504,117 | 4/1996 | Gorfine | 514/742 |
| 5,595,753 | 1/1997 | Hechtman | 514/565 |

OTHER PUBLICATIONS

Handbook of Pharmaceutical Excipients, Published by the American Pharmaceutical Association, pp. 209–213, 1986.

Article entitled "Dis Colon Rectum" by S. R. Golfine, Diseases of The Colon and Rectum, May 1995.

Article entitled Different Mechanisms of L–Arginine Induced Dilation of Brain Arterioles In Normotenstive and Hypertensive Rats, by M. Riedel et al. in Brain Research 671 (1995) 21–26.

*Primary Examiner*—Raymond Henley, III

*Attorney, Agent, or Firm*—Dianne E. Reed; Bozicevic & Reed LLP

[57] ABSTRACT

An anal fissure treatment preparation utilizing an L-arginine salt in an aqueous solution. The solution is applied to the perianal area topically for treatment.

14 Claims, No Drawings

ANAL FISSURE TREATMENT PREPARATION AND METHOD

This application is a continuation of application Ser. No. 08/636,655 filed Apr. 23, 1996, now abandoned.

BACKGROUND OF THE INVENTION

The present invention relates to a novel anal fissure treatment preparation and method.

Anal fissures are small tears in the lining of the anus which may be caused by hard or excessive bowel movements, inflammation of the anorectal area, and the like. Anal fissures may heal over a period of time, if the fissure is not exacerbated in some manner.

In addition, antiseptics and emollients may be applied to the anal area containing the fissure. For example, anti-fungus agents such as nitrate salt have been employed in this regard. Cortisone-type compounds have also been applied to anal fissures to heal abscesses. Anal fissures have also been treated by the application of zinc compounds, sugar powder, glycerol, and the like. The application of such treatments are often accompanied by scraping out the fissure prior to application and subsequently covering the fissure with medical adhesive films. Prior treatments of this nature have met with limited success.

Sitz baths are also used to encourage healing of an anal fissure. In addition, magnetized water baths combined with ultrasonic application has also been employed to treat anal fissures. Moreover, stool softeners and internal medicaments to prevent constipation have found some use in treating anal fissures.

In many cases, scarring or muscle spasm of the internal anal sphincter muscle prevents healing of the anal fissure. In these instances, surgery, known as a sphincterotomy, may be prescribed. The sphincterotomy includes the cutting of a portion of one or more of anal muscles to prevent spasms and the pain associated therewith to allow healing of the fissure. Unfortunately, even the performance of a sphincterotomy does not promote the healing of an anal fissure. In addition, the sphincterotomy may cause greater problems since the anal opening is enlarged leaving the patient with less sphincter control of the anal area.

Anal fissures have been treated in the past by nitroglycerin ointments. Such treatment is discussed in an article, entitled "Dis Colon Rectum" by S. R. Golfine, Diseases Of The Colon and Rectum, May 1995. It is believed that the nitroglycerin is capable of releasing nitric oxide which serves as a muscle relaxant. Unfortunately, nitroglycerin is very difficult to manufacture and handle since it is quite volatile.

L-arginine has also been employed to induce vasodilation in rat pial arterioles. It is known that arginine is the endogenous substrate for the synthesis of nitric oxide (NO). For example, an article entitled"Different Mechanisms of L-Arginine Induced Dilation Of Brain Arterioles In Normotensive and Hypertensive Rats, by M. Riedel et al., in Brain Research 671 (1995) 21–26 discusses such effect.

A treatment for anal fissures which is easy to manufacture and use without causing adverse side effects would be a notable advance in the medical field.

SUMMARY OF THE INVENTION

In accordance with the present invention a novel and useful treatment preparation and method for anal fissures is herein provided.

The present invention utilizes L-arginine in a medium such as an aqueous solution. It is believed that the solution may be combined with a gel or made into the form of a suppository which may be used in a conventional manner. The L-arginine used may be in the form of either a free base or a salt, such as a hydrochloride, acetate, and the like. If the free base form is used, the solution may be neutralized with an acid such as hydrochloric, phosphoric, or acetic acid. In this form, the preparation may be applied directly to the anal rectal area of the body and to the anal fissure itself.

Topical application of the treatment of the present invention over a period of time has been found to eliminate the pain to the patient, and the associated spasm. Also, it has been observed that the anal fissure heals over a time period without pain to the patient.

It is theorized that the successful use of the treatment of the present invention is due to the fact that L-arginine serves as a substrate for NO-synthase, thus producing nitric oxide. In turn, the nitric oxide induces vasodilation in the anal-rectal area, to counteract the normally poor blood supply to the skin around the sphincter muscle. It is also believed that the vasodilation eliminates the spasm that typically develops with a fissure that further hinders the healing process.

It may be apparent that a novel and useful preparation for treatment of an anal fissure is herein provided.

It is therefore an object of the present invention to provide a topical preparation for treatment of an anal fissure which is safe and effective.

Another object of the present invention is to provide a topical preparation for treatment of an anal fissure which does not exhibit any side effects during the treatment.

Another object of the present invention is to provide a topical preparation for treatment of an anal fissure which reduces pain and eliminates the spasm associated therewith to aid in the healing process.

A further object of the present invention is to provide a topical preparation for treatment of an anal fissure which includes L-arginine to promote vasodilation and increase the blood supply in the vicinity of the anal fissure at the anal-rectal area.

Yet another object of the present invention is to provide a topical preparation for treatment of an anal fissure which may be formed into a liquid solution, a gel, or a suppository for use in the anal-rectal area.

Another object of the present invention is to provide a topical preparation for treatment of an anal fissure which eliminates the necessity of the performance of a sphincterotomy.

The invention possesses other objects and advantages especially as concerns particular characteristics and features thereof which will become apparent as the specification continues.

DETAILED DESCRIPTION OF THE PREFERRED EMBODIMENTS

Various aspects of the present invention will evolve from the following detailed description of the preferred embodiments thereof.

The topical preparation of the present invention utilizes as one of its ingredients L-arginine, an amino acid, possessing one amino group and a guanidine group whose structure is well known, ($C_6H_{14}N_4O_2$). Arginine is generally crystalline and is a basic amino acid. Arginine may be mixed with a carrier or medium such as water to form an aqueous solution in which the concentration of arginine varies between 8.6×

$10^{-1}$ and $10^{-7}$ moles per liter. It is believed that arginine in this solution is a nitric oxide donor.

In certain cases, to prevent irritation due to the basic characteristics of the L-arginine, the arginine may be combined with a pH neutralizing agent. For example, the arginine may be prepared in the form of a salt which forms a neutral solution. A typical salt anion used in this regard would be hydrochloride, acetate, phosphate, and the like. Thus, L-arginine hydrochloride would be a suitable starting element. It should be noted that other salts may suffice in this regard. Alternately, a basic solution of arginine may be neutralized by addition of an acid such as hydrochloric, acetic, or phosphoric. In its dissolved form, the arginine solution may be applied to the anal-rectal area with a swab. In addition, the L-arginine may be formed into a gel or suppository by known methods. For example high molecular weight, polyethylene glycol may be added to the L-arginine to form a suitable suppository.

When applied in the treatment of anal fissures, it is believed that the L-arginine promotes the release of nitric oxide which eliminates the spasm of the anal fissure and increases the vasodilation in the anal-rectal area. The latter effect increases blood supply which aids in the healing process. It has been found that the application of L-arginine in the embodiments depicted above reduces pain to the patient suffering from anal fissures during the healing process.

The following examples are illustrative of the invention in practice, but are not deemed to limit the scope of the invention in any manner whatsoever.

EXAMPLE 1

An arginine salt, arginine hydrochloride, was weighed out in the amount of 210.7 milligrams. The arginine salt was added to one liter of water to make a 0.001 molar (0.2% w/w) solution. About 5 milliliters of this solution was applied to the tissue paper compress and dabbed on the anal-rectal area of a male subject suffering from an anal fissure condition. The patient related that the anal fissure pain subsided within five (5) minutes. After several hours, the pain returned. The compress containing the arginine solution was again made up and applied five (5) hours later to the same subject. The second treatment involved keeping the compress in contact with the anal rectal area for approximately six (6) hours. The third and fourth compresses were prepared and applied six (6) and seven (7) hours later. Approximately 2 and ½ hours following the fourth compress, the patient complained of some pain returning. At that time, a fifth compress was applied and the pain diminished in approximately ten (10) minutes. The fifth compress was removed approximately an hour and twenty minutes later. The patient exhibited little pain at that time. Two to three hours later, the pain began to return to a lesser degree. It is noted that the outer tissue was red and swollen around the perianal area. Approximately seven hours later, the patient took a sitz bath and an aspirin. Within twelve (12) hours, the patient stated that he was pain free and the bleeding of the anal fissure had ceased. The outer fissure was still swollen, but to a lesser degree than the previous examination twelve (12) hours prior to this time. A temporary swab was used several days later containing the arginine solution. Again, the pain decreased. The use of the arginine solution was continued periodically for a period of approximately five (5) months. The pain of the anal fissure and the swelling and bleeding of the perianal area subsided completely during this period of time.

EXAMPLE 2

A male subject suffering from anal fissures applied the arginine hydrochloride solution (about $1\times10^{-3}$M) combined with a preparation containing polyethylene glycol 300, polyethylene glycol 3350, and benzethonium chloride, to form an ointment. The ointment was applied to the anal area with a swab every three (3) to four (4) hours over a two-day period. The anal fissure area, although tender, healed adequately within a two-day period so that the patient suffered no pain or discomfort. The patient had experienced recurring problems with anal fissures prior to this treatment.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A method of treating an individual with an anal fissure, comprising periodically administering to the anal-rectal area of the individual a pharmaceutical composition comprising a carrier and, as an active agent, an acid addition salt of L-arginine, wherein (a) the amount of the active agent in the composition and (b) the time period during which treatment is carried out are selected so as to provide for healing of the anal fissure.

2. A method of treating an individual with an anal fissure, comprising administering to the anal-rectal area of the individual a pharmaceutical composition comprising an aqueous solution containing approximately $10^{-7}$ to 0.86 moles/liter of an active agent selected from the group consisting of L-arginine hydrochloride, L-arginine acetate, and L-arginine phosphate, wherein administration is carried out for a time period effective to heal the anal fissure.

3. A method of treating an individual with an anal fissure, comprising administering to the anal-rectal area of the individual a pharmaceutical composition comprising an aqueous solution containing approximately $10^{-7}$ to 0.86 moles/liter of L-arginine hydrochloride, wherein administration is carried out four to eight times per day for a time period effective to heal the anal fissure.

4. The method of claim 3, wherein the time period is at least two days.

5. The method of claim 4, wherein the time period is up to approximately five months.

6. The method of claim 3, wherein the solution contains approximately $10^{-3}$ moles/liter of the active agent.

7. A method of treating an individual with an anal fissure, comprising periodically administering to the individual a pharmaceutical composition in the form of a rectal suppository, an ointment or a gel comprising a carrier and an active agent selected from the group consisting of L-arginine hydrochloride, L-arginine acetate, and L-arginine phosphate, wherein the amount of active agent in the composition and the time period during which treatment is carried out are selected so as to provide for healing of the anal fissure.

8. The method of claim 7, wherein the active agent is L-arginine hydrochloride.

9. The method of claim 7, wherein the pharmaceutical composition is comprised of a rectal suppository.

10. The method of claim 8, wherein the carrier comprises polyethylene glycol.

11. The method of claim 7, wherein the pharmaceutical composition is comprised of an ointment.

12. The method of claim 11, wherein the carrier comprises polyethylene glycol.

13. The method of claim 12, wherein the carrier comprises a mixture of polyethylene glycol 300 and polyethylene glycol 3350.

14. The method of claim 7, wherein the pharmaceutical composition is comprised of a gel.

* * * * *